3,333,962
TREATMENT OF PYRETHRUM PLANT WASTE MATERIALS AND UTILIZATION IN FEED
Harry J. Prebluda, Trenton, N.J., and Peter F. Wertz and Walter H. Hoffman, Springfield, Mo., assignors to Hoffman-Taff, Inc., Springfield, Mo., a corporation of Missouri
No Drawing. Filed Dec. 2, 1963, Ser. No. 327,535
22 Claims. (Cl. 99—2)

This invention relates to the treatment and utilization of certain plant waste material and, in particular, to the treatment of waste materials from the pyrethrin industry to obtain valuable by-products, including a product containing xanthophyll in a form available for use in animal feeds and for isolation as a coloring agent for use in foodstuffs, pharmaceuticals and the like.

The separation of pyrethrins from pyrethrum flowers, as accomplished in accordance with commercial procedures, involves the treatment of pyrethrum flower heads with organic solvents. The plants yielding these flowers heads belong to the genus Chrysanthemum (section Pyrethrum) which is included in the family Compositae. The flower heads of the pyrethrum species *C. cinerariifolium*, the species which is most commonly used for active pyrethrin content, comprises a central disc of yellow tubular florets borne on a rounded receptacle and encircled by a row of white or cream ray petals. The entire flower head is processed and it has been reported that most of the active pyrethrins occur in the ovaries with the remainder being located in the disc florets, receptacles and scales, and in the petals. Various strains of the species containing active pyrethrins are grown throughout the world and are widely cultivated in Africa, Japan and South America. For the purpose of the present invention, it will be understood that the waste material utilized may be derived from extracts from any of the known species and sources.

Crude pyrethrum extract is obtained from the pyrethrum flower heads in a variety of ways. The pyrethrum flower heads may be extracted with any of a number of organic solvents, such as Deo-base (deodorized kerosene fraction), hexane, petroleum ether, acetone or ethylene dichloride. The extracting solvent invariably extracts substantial amounts of highly colored impurities including waxes (high molecular weight alcohols and esters), resinous substances (natural resins and pyrethrin polymers), and lesser amounts of free organic acids, liquid esters, oils, and plant pigments, along with the active pyrethrins. The residue remaining after the extraction, i.e., the extracted chrysanthemum flower heads, when dried and ground has been used as a feed additive, for its adsorptive qualities and for use in fertilizers.

The crude pyrethrum extract is treated to remove most of the extracting solvent and the remaining material is usually supplied to the insecticide manufacturing plant as a dark viscous mass known as the oleoresin or as a concentrate in an aliphatic solvent such as kerosene or other hydrocarbon fractions. Crude concentrates shipped to the United States from Africa, Japan and South America contain about 20 to 30 percent pyrethrins by weight of solution along with a larger amount of contaminants of the sort previously discussed. These contaminants also make up a major portion of the oleoresin.

The waxes and other contaminants are removed by the insecticide manufacturer from either the oleoresin or the concentrated pyrethrum extract prior to working up the active pyrethrin content into insecticidal solutions for use in aerosol bombs and the like. Some of the impurities may precipitate when the crudes are diluted with kerosene or its fractions, or with other solvent, to usable concentration. The crude oleoresin or the concentrated extract may also be freed of the waxy and other impurities by methanol extraction or precipitation. The active pyrethrins have been removed from the residual waxy impurities by molecular distillation. Other methods comprise precipitation of the residual waxes and coloring matter from Freon solutions of partially purified pyrethrins. Regardless of the method of removing the waxes and other impurities, which will hereinafter be referred to broadly as the "waxy residue obtained from pyrethrum extracts," a substantial amount of a waste material is obtained which, up to the present time, has had no known use. The waxy residues separated from the oleoresin and pyrethrum extracts have collected in large quantities at pyrethrum processing plants to such an extent as to present waste disposal problems. In many instances, this waste material may comprise wastes from several purifying steps and may include filter aids, decolorizing adsorbents and the like. All are usable as source material for the present invention.

It has now been discovered that the waxy residue of the pyrethrum industry can be worked up into highly useful products and, in particular, to provide a concentrated source of xanthophylls for use as a pigmenting agent, e.g., in the food and manufactured animal and poultry feed industries. The xanthophyll fraction may also contain carotene and other plant derivatives which provide valuable contributing factors when the product is used in human and animal foodstuffs. The term "animal feed" as used herein is intended to include poultry feed.

The poultry industry, in its present highly-developed stage, has been concerned with the problem of producing chickens with acceptable skin, shank and fat color, and of producing eggs with yolks which have a desirable level of color. Chickens and eggs having desirable pigmentation bring premium prices on the market. The natural compounds of poultry feed, such as yellow corn and alfalfa, produce a certain degree of pigmentation. However, the optimum level of pigmentation is rarely obtained with these materials as the sole source of pigmentation without interfering with the growth and egg producing efficiency of the ration. Further, there are occasions where, for reasons of economy and availability, it is desirable to use components other than those which are the current source of pigmentation in the production of poultry feed. Many areas which are large poultry-producing areas have natural sources of feed such as milo, kafir corn, white corn and so forth, which are desirably used in the poultry feed materials, but fail to supply adequate sources of pigmentation. Various and costly materials, both natural and synthetic have been used to obtain more pigmentation in poultry and eggs. It has been established, however, that xanthophyll, the natural pigment of plants is a necessary substance in poultry feed to produce the desired yellow pigmentation in the skin and fat of poultry and also to provide proper coloration of the egg yolks. Dried yellow flower petals have been suggested as a source of xanthophyll for poultry feeds. However, we have determined that the dried flower head residues from the pyrethrum extraction contain little of this important material.

We have now discovered that the waxy residues obtained from the purification of the pyrethrum extracts provide an economical and acceptable source of xanthophyll. These waxy residues, regardless of source, have been found to contain an average of about 3 to 6 grams of xanthophyll per pound. However, when these residues are incorporated directly into a poultry feed, there is very little affect upon the pigmentation of the poultry or of the egg yolks. We have found that if the waxy residues are first saponified, the xanthophyll content of the resulting material becomes readily available. The product may then be used in crude form or be further purified depending upon the desired usage. When used for feed purposes, it is of value in pigmentation of skin, shanks and fat of poultry and improves the color of the egg yolks.

It is an object of this invention, therefore, to provide a new and important use of waste plant material from the pyrethrum industry.

Another object of the invention is to provide a process for making available the xanthophyll content of the waxy residues of the pyrethrum industry.

Another object of the invention is to provide new xanthophyll-containing products.

A further object of the invention is to provide an economical process for producing a poultry feed of increased xanthophyll content.

A still further object of the invention is to provide a method for improving the pigmentation of the skin, shanks and adipose tissue of poultry.

A further object of the invention is to provide a method for improving egg yolk color.

These and other objects and advantages of the invention, which will become apparent from the description hereinafter, are, in general, accomplished by saponifying the waxy residue obtained from pyrethrum extracts or oleoresin with suitable alkaline material and recovering the unsaponifiable fraction containing the xanthophyll content. This unsaponifiable fraction may be used as such or may be incorporated in or on an organic carrier material which may be a solid or liquid fat or oil, alcohol, wax, gelatin or other substance in which xanthophyll is soluble or dispersible or on an inorganic solid carrier material or in or on a combination of such carriers with or without emulsifiers. If desired, the entire product of saponification, including the unsaponifiable fraction containing xanthophyll, can be incorporated directly into animal or poultry feed. It can be dissolved in a volatile solvent, e.g., alcohol which can be sprayed upon the feed material or otherwise dispersed in the feed.

The unsaponifiable fraction, alternatively, may be further refined in a number of ways so as to obtain xanthophyll in more concentrated form. For example, it can be subjected to solvent extraction procedures, solvent partitioning, fractional precipitation, fractional crystallization, molecular distillation, and chromatography to remove salts, saponified fractions, waves and/or other biological fractions for working up into additional important by-products. For example, a waxy substance can be precipitated by addition of methanol and/or other solvents to the unsaponifiable fraction. If the xanthophyll is isolated from the natural waxes with which it is associated in the waxy residue, it can be protected from oxidation by use of conventional antioxidants. The refined xanthophyll product is useful for coloring foods such as cheeses, margarine, carbonated beverages, salad dressings, i.e. French dressings and the like, prepared cake mixes, etc.

The saponification of the waxy residues can be accomplished with any alkaline material known to be useful in saponification procedures, and is conveniently carried out with an aqueous alkali such as sodium or potassium hydroxide. It has also been found that the saponification is most readily accomplished in the presence of lower aliphatic alcohols, e.g., methyl, ethyl, propyl, iso-propyl, butyl, sec.-butyl, t-butyl, amyl, etc., although this is not essential and other solvents including ether and higher boiling solvents may be used. Additionally, ketones and petroleum solvents may be present during the saponification procedure. The saponification may be accomplished either by permitting the reaction mixture to stand at room temperature for a number of hours, or by heating it to the reflux temperature of the solvent for a shorter time. In accordance with one embodiment of the invention, the reaction mass is neutralized with an acidic material, e.g., an organic or mineral acid, such as HCl, or acid salts, and is then cooled and filtered. Part of the potassium or other alkali metal is removed as a crystallized salt in this operation along with other insoluble matter. The xanthophylls remain in the filtrate. This can be concentrated by evaporation to obtain almost quantitative yields of xanthophyll along with some carotenes, waxes and other materials that do not detract from the value of the product as a coloring agent in food use or as a pigmenting factor in animal and poultry feeds. If desired, the filtrate may be treated to remove waxes, as by methanol addition and precipitation, prior to the evaporation thereby obtaining a purer xanthophyll product.

Alternatively, the unsaponifiable fraction may be separated from the saponified materials of the reaction mixture, with or without neutralization, by extraction in a suitable solvent. Hexane, petroleum naphtha, ethylene dichloride, and the like are suitable for such extraction. The saponifiables, e.g., alkali salts of chlorophyll and other fatty acids and other saponifiables, are removed as an aqueous phase. The extracting solvent for the unsaponifiable fraction is then removed and the material which now contains xanthophyll in a form readily available for human or animal use can be worked up as desired. The xanthophyll product at any stage after saponification can be further processed by incorporation in a liquid or solid fat or oil, wax, or gelatin carrier, by dissolution in a volatile solvent, or by further incorporation in a feed or inert carrier to provide a concentrate.

The invention will be further illustrated by the following examples of practice.

Example 1

450 gms. of a composite waxy residue assaying 3.30 gms. xanthophyll and 0.71 gm. carotene per pound obtained from pyrethrum crude extract from Ecuador, Kenya and East Africa were hydrolyzed by refluxing for two hours with 400 gms. of 50% aqueous KOH and 2 liters of isopropyl alcohol. The resulting reaction mass was cooled and neutralized with 208 cc. of concentrated HCl (12 N) to a pH of 7.5. The neutralized mass was further cooled and filtered. The residue on the filter (KCl) was washed with 100 cc. of isopropyl alcohol to give a final volume of filtrate of 3.4 liters. This filtrate analyzed 1.01 mgm. of xanthophyll per ml. making a total xanthophyll content of 3.434 gms. The 3400 ml. of filtrate was split into two portions of 1700 ml. each. One 1700 ml. fraction was dried in vacuo to provide a residue of 157 gms. This was taken up with 500 cc. of absolute ethyl alcohol to provide a solution assaying 2.375 mgm. of xanthophyll per gm. of solution. This solution was then incorporated in a milo basal ration in an amount sufficient to add 35 mgm. xanthophyll per pound of feed. This ration was fed to laying hens and after seven days, there was a significant increase in the egg yolk pigmentation of eggs from these hens. The average NEPA number of the eggs produced after the first seven days on this ration was 4.25. At the end of 14 days the average NEPA number of the eggs had increased to 6.0 and at the end of the test, after 20 days, the NEPA number of the eggs was 6⅛.

Example 2

227 gms. of a waxy residue from the same source material as in Example 1 were mixed with 200 gms. of 50% w./w. aqueous KOH plus 1 liter of isopropyl alcohol and the resulting material was refluxed for 2 hours. The mixture was cooled then neutralized to pH 7.5 with 12 N HCl and filtered to remove KCl. The residue was washed with isopropyl alcohol and the total filtrate was mixed with 404 gms. of an inert carrier material produced from ground corn cobs and dried in vacuo. The product weighed 539 gms. and contained 2.021 gms. of xanthophyll. This material was mixed with a milo basal ration in an amount sufficient to add 28.6 mgm. of xanthophyll per pound of feed and the resulting xanthophyll-enriched feed was fed to laying hens. After the first seven days, eggs produced by these hens had an average NEPA number of 1¾. At the end of 14 days the NEPA number of the eggs had increased to 3¼. A further increase in NEPA number to 3⅜ was obtained by the completion of the test on the 28th day.

*Example 3*

Another 227 gm. sample of waxy residue from the same source material as in Examples 1 and 2 was mixed with 80 gms. of KOH, 40 ml. of water and 40 ml. of methyl alcohol. This mixture was allowed to stand overnight after thorough mixing. 400 ml. of isopropyl alcohol were then added and the solution was neutralized with HCl to a pH of 7.5. The precipitate was filtered off and washed with 200 ml. of isopropyl alcohol. The isopropyl alcohol solutions were combined and mixed with 404 gms. of the same carrier material as in Example 2. The alcohol was removed in vacuo. The product weighed 522 gms. and contained 3.15 mgm. of xanthophyll per gm. This material was mixed into a milo basal ration in an amount sufficient to add 34.4 mgm. of xanthophyll per pound of feed. The feed was then fed to a group of laying hens. At the end of seven days the average NEPA number of the eggs produced by these hens was 2. At the end of 14 days the NEPA number of the eggs had been raised to 3¼. On the 21st day the average NEPA number of the eggs produced was 3⅞ and on the 28th day, the end of the test, the average NEPA number of the eggs produced remained at 3⅞.

*Example 4*

235 gms. of a waxy residue assaying 4.09 gms. xanthophyll per pound and obtained from a pyrethrum crude extract from an East African source were mixed with 75 gms. of aqueous KOH, dissolved in 300 ml. of 95% methanol and the mixture was allowed to stand at room temperature overnight. The mixture was filtered, the residue washed with 1 liter of ethylene dichloride and the combined filtrate and ethylene dichloride wash was partitioned with 3 liters of water. The water layer was extractd with 1 liter of ethylene dichloride and combined extract and ethylene dichloride washes were evaporated in vacuo. The resulting product was mixed with 50 lbs. of milo basal ration to increase the xanthophyll content of the feed. This xanthophyll-enriched ration was fed to a group of laying hens. After four days the average NEPA number of the eggs produced was 1¾. After 11 days the average NEPA number of the eggs was 4.0. At the end of 23 days the average NEPA number was 5 and at the end of the test on the 32nd day, the NEPA number of the eggs remained at 5.

*Example 5*

57 gms. of a composite waxy residue assaying 4.13 gms. of xanthophyll per pound and obtained from a pyrethrum crude extract obtained from Ecuador, Kenya and East Africa sources were mixed with 500 ml. of 50% aqueous KOH and 500 ml. of 95% methanol plus 2 liters of hexane and the mixture was refluxed for 30 minutes. The hexane layer was decanted and the aqueous layer was refluxed again with 2 liters of hexane for 30 minutes. After decanting the hexane extract, the aqueous layer was again refluxed for 30 minutes with 1 liter of hexane. The hexane fractions were combined, washed free of alkali and the hexane was evaporated in vacuo to give a xanthophyll-containing residue. This material was incorporated in 12½ lbs. of milo basal ration to increase the xanthophyll content of the feed and the resulting enriched feed was fed to a group of laying hens. At the end of 4 days the average NEPA number of the eggs produced was ¾. At the end of 11 days, the NEPA number of the eggs produced had increased to 2¼. At the end of 14 days, the NEPA number of the eggs produced had increased to 4 and at the end of the test, on the 23rd day, the NEPA number remained at 4.

*Example 6*

113 gms. of a waxy residue assaying 3.72 gms. of xanthophyll per pound obtained from a pyrethrum extract from an East African source were refluxed with 568 gms. of KOH and 1135 ml. of water and 2270 ml. of 95% methanol. After refluxing for one hour, the saponified reaction mass was diluted with 3405 ml. of water and extracted with hexane. The hexane extract was washed with water, dried over $Na_2SO_4$ and evaporated. The residue weighing about 60 gms. and containing 0.746 gm. of xanthophyll was taken up in ethyl alcohol and the alcohol solution was mixed with a basal milo ration to increase the xanthophyll content of the feed. This enriched ration was fed to a group of laying hens. At the end of seven days the average NEPA number of the eggs produced was 2¼ and at the end of two weeks to the end of the test, the NEPA number of the eggs produced had leveled off to about 3¼.

*Example 7*

113 gms. of a waxy residue from the same source as in Example 6 was treated by the same process as set forth in Example 6, except that NaOH was used in place of KOH. The resulting material containing 0.378 gm. of xanthophyll was incorporated in a basal milo ration as before to increase the xanthophyll content of the feed. This feed was fed to a group of laying hens and at the end of one week, the average NEPA number of the eggs produced was about 1¼. At the end of two weeks the NEPA number of the eggs produced had increased to about 1¾ and at the end of three weeks, the end of the test, to a NEPA number of about 2.

*Example 8*

56.7 gms. of a waxy residue assaying 3.72 gms. of xanthophyll per pound and obtained frrom a crude pyrethrum extract from an East African source were mixed with 500 ml. of 50% aqueous KOH and 500 ml. of propyl alcohol. 2000 ml. of normal hexane were added and the mixture was refluxed for 30 minutes. The hexane layer was decanted and an additional 2000 ml. of normal hexane were added and the solution refluxed for an additional 30 minutes. The hexane layers were combined, washed with water and then evaporated down to provide a xanthophyll-containing residue which was taken up in 95% alcohol and incorporated into a basal milo ration to increase the xanthophyll content of the feed. This ration was fed to a group of laying hens. At the end of six days, the NEPA number of the eggs produced was 2. At the end of the 9th day, the NEPA number had increased to 3¾ and at the end of 18 days, the average NEPA number of the eggs produced was 5. The NEPA number remained at 5 throughout the remainder of the test, which ended on the 27th day.

*Example 9*

113 gms. of a waxy residue from the same source as in the preceding example were mixed with 50 gms. of KOH and 30 ml. of water. 200 ml. of normal propyl alcohol were added and the resulting mixture was refluxed for 2 hours. 40 gms. of HCl were then added to neutralize the mixture and KCl, which crystallized out, was discarded. The propyl alcohol layer was decanted off and evaporated down to obtain a xanthophyll product. This product was taken up in 95% ethyl alcohol and incorporated in a basal milo ration to increase the xanthophyll content of the feed. This ration was then fed to a group of laying hens. At the end of 5 days, the average NEPA number of the eggs produced was 1½. At the end of 17 days, the average NEPA number of the eggs produced had increased to 3¾ and at the end of the test on the 22nd day, the average NEPA number of the eggs was 4.

*Example 10*

113 gms. of a waxy residue obtained from the same source as in the preceding example were mixed with 50 gms. of KOH, 50 ml. of water and 200 ml. of normal propanol. This mixture was refluxed for 2 hours and 3000 ml. of normal hexane were then added. The mixture was neutralized with 46 gms. of concentrated HCl and the layers separated in a separatory funnel. The lower layer containing KCl was discarded, the hexane layer was evaporated down to provide a xanthophyll-containing product. This was dissolved in 95% ethyl alcohol and mixed with a basal milo ration to increase the xanthophyll content of the feed. The resulting enriched feed was fed to a group of laying hens. At the end of 5 days the average NEPA number of the eggs was 1. At the end of 17 days the average NEPA number of the eggs had increased to 3¼ and by the end of the 32nd day, the last day of the test, the average NEPA number of the eggs produced was 3½.

*Example 11*

113 gms. of a waxy residue from the same source as in the preceding example was mixed with 500 ml. of 50% aqueous KOH and 500 ml. of isopropyl alcohol. The mixture was refluxed for 2 hours and then neutralized with HCl. After standing, the lower layer containing precipitated KCl was discarded and the upper layer was evaporated to provide a xanthophyll-containing product. This material was dissolved in 95% ethyl alcohol and incorporated in a basal milo ration as before. This ration was fed to a group of laying hens and at the end of the 11th day, the average NEPA number of the eggs produced was 3¾. By the 20th day, the average NEPA number of the eggs produced was 5 and remained at 5 on the 27th day, the end of the test.

*Example 12*

56 gms. of a waxy residue from the same source as in the preceding example was mixed with 25 gms. of KOH and 100 ml. of 95% ethyl alcohol. This mixture was refluxed for 2 hours. 18 gms. of concentrated HCl were added to neutralize the resulting mixture and the entire amount of material without separation was incorporated in a basal milo ration to increase the xanthophyll content of the feed. The xanthophyll-enriched ration was fed to a group of laying hens and at the end of six days the average NEPA number of the eggs produced had increased to 3½ and by the end of the test, the 27th day, the average NEPA number of the eggs produced had increased to 5¾.

The basal milo ration used in the foregoing examples had the following analysis:

*Basal diet*

| Ingredients: | Percent of diet |
| --- | --- |
| Ground milo (9%) | 67.15 |
| Soybean oil meal (44%) | 16.00 |
| Fish meal (60%) | 5.00 |
| Limestone (34% Ca; 14.5% P) | 4.50 |
| Phosphate | 3.10 |
| Fermentation residue (25%) | 0.50 |
| Distillers dried solubles (28%) | 2.50 |
| Vitamin and mineral premix [1] | 1.00 |
| Salt (NaCl) | 0.25 |

[1] Supplied the following per pound of diet: vitamin A, 3,000 I.U.; vitamin D$_3$, 750 I.C.U.; choline chloride, 500 mg.; calcium pantothenate, 5 mg.; niacin, 12.5 mg.; riboflavin, 2 mg.; vitamin B$_{12}$, 6 mcg.; vitamin K, 12 mg.; vitamin E, 2 I.U.; ethoxyquin, 56.75 mg.; ZnO, 52.25 mg.; MnSO$_4$, 56.75 mg. Protein, 17.0%. Calorie/lb., 925.

Diets were calculated to be approximately isocaloric and isonitrogenous by adjustment of soybean meal, and rice oil.

This is considered to be a practical feed formula for laying hens for egg production in that it is complete as to all known essential nutrients. However, the yolks of hens fed this diet will be substantially white. The use of such a diet makes it possible to immediately detect the effect of additions of xanthophyll-like compounds or xanthophyll-containing ingredients. Differences in egg yolk color may be detected after a period of only a few days and increase to a maximum during the next several weeks.

It will be understood that the xanthophyll-containing product may be added to other rations including those adapted for feeding broilers to thereby enhance the pigmentation of the skin tissues, shanks and fat. The amount of xanthophyll-containing product incorporated in poultry feeds, whether for broilers or layers, in general, will be in the range sufficient to provide about 5 to 50 mgm. of xanthophyll per pound of feed.

The NEPA numbers referred to above were obtained by standard methods developed by the National Egg Producers Association. Reference is made to "Food Engineering," Vol. 21, pp. 467–470 (1949). The tests, for the most part, were conducted under adverse high temperature layer house conditions encountered during the summer months. In each instance, however, an improvement in egg yolk color was obtained during the course of the tests.

*Example 13*

A dried non-saponifiable xanothophyll-containing fraction produced by a process as set forth in Example 4 is incorporated in an edible salad oil in an amount sufficient to provide an orange or reddish orange color (e.g., about 2 to 4 gms. per pound of oil). This oil is then suitable for salad oil use in the conventional manner to produce attractively-colored salad dressings.

The dried residues from the extraction procedures of Examples 5–11 may be similarly incorporated in an edible oil. Concentrates in edible oils, fats or other edible carriers can be used for addition to other foodstuffs to effect coloration thereof. The extracts may be treated prior to solvent evaporation to precipitate waxy material and thereby provide a more refined xanthrophyll product when the solvent is evaporated. This product may be stabilized by addition of small quantities of conventional antioxidants.

It will be apparent to those skilled in the art that this invention is susceptible to many modifications without departing from the scope and spirit thereof as disclosed, and it is intended that such variation be included within the scope of the appended claims.

We claim:

1. An animal feed containing a basal feed ration and an amount of a xanthrophyll-containing product comprising the neutralized entire reaction mass resulting from alkali saponification of the waxy residue removed from pyrethrum extracts sufficient to provide from about 5 to 50 milligrams of xanthophyll per pound of feed.

2. A process for the treatment of the waxy residue obtained from pyrethrum extracts to provide xanthophyll in available form comprising saponifying said residue with an alkaline saponifying agent.

3. The process of claim 2 wherein the unsaponifiable fraction containing said xanthophyll is separately recovered from saponified material.

4. The process of claim 2 wherein the said waxy residue is saponified with an aqueous alkali and the saponified reaction mass is neutralized with acidic substance.

5. A process for the treatment of the waxy residue obtained from pyrethrum extracts to provide xanthrophyll in available form comprising saponifying said residue with aqueous alkali in the presence of a lower aliphatic alcohol.

6. The process of claim 5 wherein the alkaline alcoholic solution resulting from saponification is neutrailzed with a mineral acid and is cooled and filtered to remove alkali metal salt and other insolubles.

7. The proces of claim 6 wherein the alcoholic filtrate containing the unsaponifiable fraction including xanthophyll is concentrated by evaporation.

8. The process of claim 7 wherein the concentrated product is incorporated in an animal feed.

9. The process of claim 2 wherein the waxy residue is saponified by treatment with aqueous KOH.

10. The process of claim 1 wherein the unsaponifiable fraction is separated from the saponified materials by extraction in a hydrocarbon solvent.

11. The process of claim 10 wherein the extracting solvent is hexane.

12. The process of claim 11 wherein the extracting solvent is ethylene dichloride.

13. A process for treatment of the waxy residue obtained from pyrethrum extracts to provide xanthophyll in available form comprising saponifying said residue with aqueous KOH in the presence of a lower aliphatic alcohol, neutralizing the resulting material with HCl, filtering the neutralized material to provide a xanthophyll-containing solution, and removing solvent from said solution.

14. The process of claim 13 wherein the xanthophyll-containing solution is treated to precipitate waxy material, the solvent is removed from the purified xanthophyll solution and the resulting xanthophyll material is stabilized by addition of an antioxidant.

15. The process of claim 2 wherein the xanthophyll-containing product is mixed with an ingestible carrier material.

16. The process of claim 15 wherein ingestible carrier comprises and organic substance in which xanthophyll is soluble or dispersible.

17. The process of claim 15 wherein the ingestible carrier material comprises an animal feed.

18. The process of claim 15 wherein the ingestible carrier comprises an inorganic solid.

19. A process for producing a poultry feed of increased xanthophyll content comprising saponifying the waxy residue obtained from pyrethrum extract, and mixing the unsaponifiable fraction with a poultry ration.

20. The process of claim 19 wherein the said unsaponifiable fraction is mixed into said poultry ration at a level sufficient to provide about 5 to 50 milligrams of xanthophyll per pound of said ration.

21. A method for improving the pigmentation of the skin of poultry comprising feeding said poultry a ration containing an unsaponifiable fraction of a waxy residue from pyrethrum extracts.

22. A method for improving egg yolk color comprising feeding laying hens a ration containing an unsaponifiable fraction of a waxy residue from pyrethrum extracts.

References Cited

UNITED STATES PATENTS

| | | | |
|---|---|---|---|
| 1,595,538 | 8/1926 | Yamamota et al. | 260—468 |
| 2,394,278 | 2/1946 | Wall et al. | 260—666 |
| 2,460,796 | 2/1949 | Eckey. | |
| 2,841,495 | 7/1958 | Stewart | 99—2 |

OTHER REFERENCES

Burdick: Economic Botary, vol. 10 (1956)., pages 267–272, 274, 275 and 277.

Palmer: Carotinoids and Related Pigments, pages 72–3 Chemical Catalog Co., Inc., New York, N.Y. (122).

U.S. Industrial Chemicals Co., Division of National Distillers Products Corp., Technical Data. IM/4/54.

A. LOUIS MONACELL, *Primary Examiner.*

D. J. DONOVAN, *Assistant Examiner.*